(12) United States Patent
Dabade et al.

(10) Patent No.: US 11,371,599 B2
(45) Date of Patent: Jun. 28, 2022

(54) SYSTEMS AND METHODS OF ACCESSIBLE BELT GUARD

(71) Applicant: Johnson Controls Technology Company, Auburn Hills, MI (US)

(72) Inventors: Nitin C. Dabade, Pune (IN); Vishal S. Jagtap, Dombivli (IN); Ravindra B. Salunkhe, Satara (IN); Vijay A. Ramakrishna Rao, Pune (IN); Pavankumar R. Toraskar, Sangli (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 66 days.

(21) Appl. No.: 16/882,324

(22) Filed: May 22, 2020

(65) Prior Publication Data
US 2021/0364079 A1 Nov. 25, 2021

(51) Int. Cl.
*F16H 57/031* (2012.01)
*F16P 1/02* (2006.01)
(Continued)

(52) U.S. Cl.
CPC ......... *F16H 57/031* (2013.01); *F16H 57/035* (2013.01); *F16P 1/02* (2013.01); *F16H 2057/02069* (2013.01)

(58) Field of Classification Search
CPC ...... F16H 57/031; F16H 57/01; F16H 57/035; F16H 2057/02069; F16P 1/02; Y10T 403/7015; G06F 1/181
(Continued)

(56) References Cited

U.S. PATENT DOCUMENTS

| 2,825,242 A | 3/1958 | Lowry |
| 2,873,131 A * | 2/1959 | Metrailer ............... A47J 43/255 |
| | | 403/348 |

(Continued)

FOREIGN PATENT DOCUMENTS

| CN | 204258498 U | 4/2015 |
| CN | 205190711 U | 4/2016 |

(Continued)

OTHER PUBLICATIONS

Belt Guard, "Belt Guard, Fiber Reinforced Plastic Products, Fibre Reinforced Plastic Products, Industries", Jan. 2017, 5 pgs.

*Primary Examiner* — Thomas C Diaz
(74) *Attorney, Agent, or Firm* — Fletcher Yoder, P.C.

(57) ABSTRACT

The system and methods described herein provide a fan belt guard housing configured to contain a fan belt of a heating, ventilation, and/or air conditioning (HVAC) unit. The fan belt guard housing includes a frame having a first lateral strut, a first flange extending from the first lateral strut, and a second flange extending from the first lateral strut, where the first flange is offset from the second flange to define a gap therebetween. The fan belt guard housing also includes an access panel configured to removably couple to the frame, where the access panel includes a cutout formed in an outer edge of the access panel, and the cutout is configured to align with the second flange of the frame such that the access panel can then slide along the first flange to position the outer edge of the access panel within the gap and capture the access panel between the first flange and the second flange in an installed configuration of the access panel.

20 Claims, 9 Drawing Sheets

(51) Int. Cl.
*F16H 57/035* (2012.01)
*F16H 57/02* (2012.01)

(58) Field of Classification Search
USPC .......................................................... 474/146
See application file for complete search history.

(56) References Cited

U.S. PATENT DOCUMENTS

| | | | | |
|---|---|---|---|---|
| 4,121,893 A | * | 10/1978 | Morissette | B60D 1/065 |
| | | | | 280/510 |
| 5,660,297 A | * | 8/1997 | Liu | G06F 1/181 |
| | | | | 220/4.02 |
| 6,814,415 B2 | * | 11/2004 | Chen | G06F 1/181 |
| | | | | 312/223.2 |
| 8,790,200 B2 | * | 7/2014 | Boissonneault | F16H 57/035 |
| | | | | 474/146 |

FOREIGN PATENT DOCUMENTS

| | | |
|---|---|---|
| CN | 206234327 U | 6/2017 |
| CN | 206338249 U | 7/2017 |
| CN | 208046357 U | 11/2018 |
| GB | 231994 A | 4/1925 |

\* cited by examiner

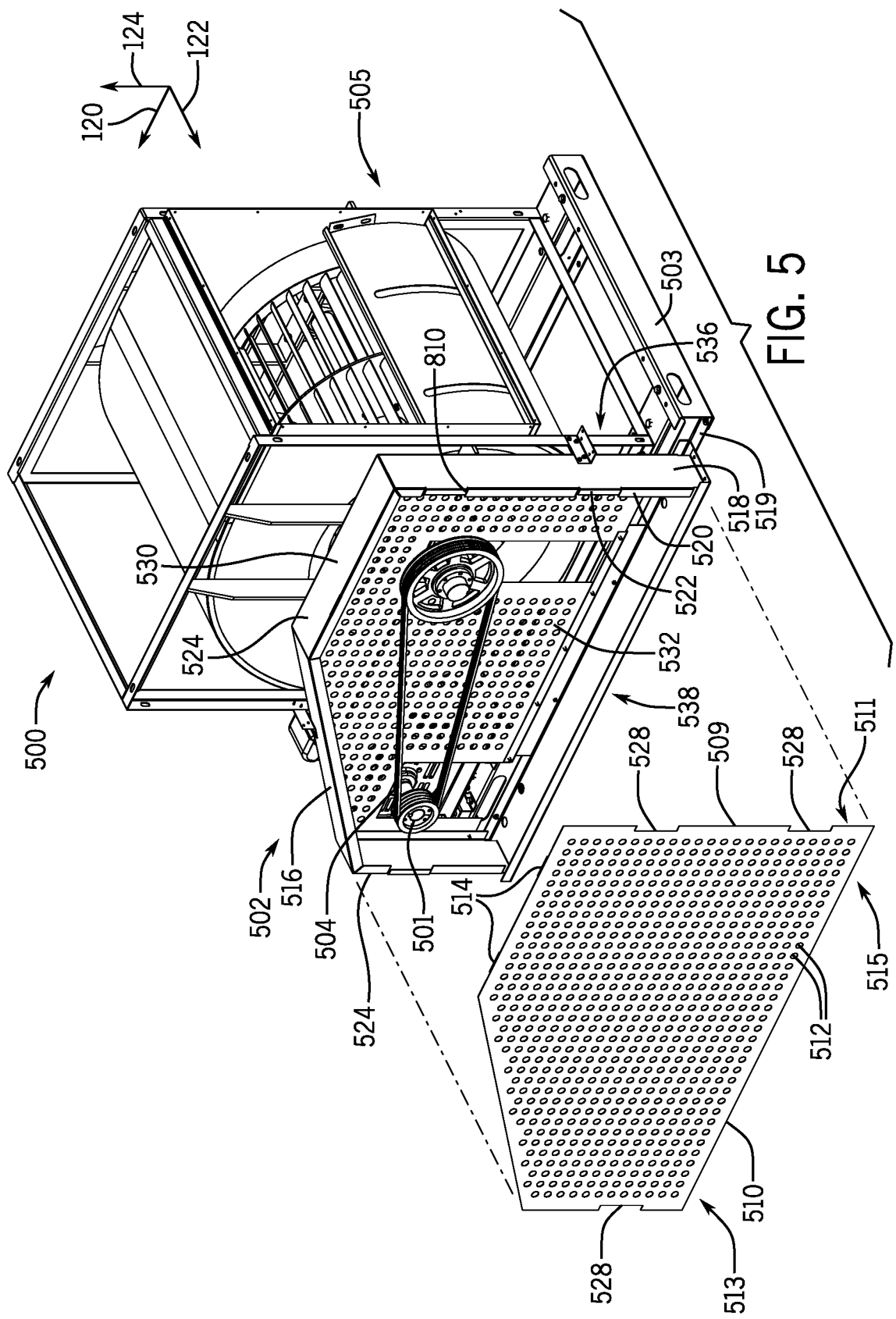

SYSTEMS AND METHODS OF ACCESSIBLE BELT GUARD

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and air conditioning (HVAC) system may be used to control environmental conditions. For example, residential, light commercial, commercial, and industrial HVAC systems are used to control environmental conditions, such as temperature and air quality, in residences and other structures. Certain HVAC units can be dedicated to either heating or cooling, although many HVAC units are capable of performing both functions. In general, HVAC systems operate by implementing a thermal cycle in which a refrigerant undergoes alternating phase changes within a refrigeration circuit to remove heat from or deliver heat to a conditioned interior space of a structure. Similar systems are used for vehicle heating and cooling, and as well as for other types of general refrigeration, such as refrigerators, freezers, and chillers.

In many applications, an HVAC system includes a blower or fan, such as a supply air fan, an exhaust air fan, and/or a return air fan, configured to induce air flow through the HVAC system. Blowers and fans are commonly driven by a motor that is coupled to the blower or fan via a belt that transfers rotational motion from the motor to the blower or fan. The HVAC system may also include other belt-driven components. During operation of the HVAC system, it may be desirable to enclose the belt to block interference with the belt as the belt moves to transfer rotational motion from the motor to the blower or fan. However, it is also desirable to access the belt during non-operational periods of the HVAC system so as enable adjustment, replacement, maintenance, and/or other performance of other procedures related to the belt and/or the components to which the belt is coupled.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a fan belt guard housing configured to contain a fan belt of a heating, ventilation, and/or air conditioning (HVAC) unit, includes a frame that has a first lateral strut. The first lateral strut includes a first flange that extends from the first lateral strut, and a second flange extending from the first lateral strut, such that the first flange is offset from the second flange to define a gap therebetween. The fan belt guard housing also includes an access panel configured to removably couple to the frame, and the access panel includes a cutout formed in an outer edge of the access panel. The cutout may align with the second flange of the frame such that the access panel can then slide along the first flange to position the outer edge of the access panel within the gap and capture the access panel between the first flange and the second flange in an installed configuration of the access panel.

In another embodiment, a fan belt guard housing includes a fan belt of a heating, ventilation, and/or air conditioning (HVAC) unit, includes a frame that is formed from a plurality of struts and the frame defines an inward space to house the fan belt. A strut of the plurality of struts has a length extending along a first direction, and the strut has a first flange positioned along a first portion of the strut. The first flange extends inwardly from the strut along a second direction that is transverse to the first direction. A second flange is positioned along a second portion of the strut, and extends inwardly from the strut in the second direction such that it is offset from the first flange. The offset is in a third direction that is transverse to the first and second directions. The fan belt guard housing also includes an access panel that has a cutout formed in on the outer edge of the access panel such that the cutout forms a recess between extensions of the outer edge. Further, the recess is sized to pass around the second flange along the third direction to allow the extensions of the outer edge to engage the first flange and then slide along the first direction into an installed position between the first flange and the second flange.

In another embodiment, a fan belt guard housing includes a fan belt of a heating, ventilation, and/or air conditioning (HVAC) unit. The fan belt guard housing further includes a frame formed of a plurality of struts and defining an inward space that houses the fan belt, such that a strut of the plurality of struts has a length extending along a first direction. The fan belt guard housing also includes a first flange positioned along a first portion of the strut such that the first flange extends inwardly from the strut along a second direction that is transverse to the first direction. Additionally, the fan belt guard housing includes a second flange positioned along a second portion of the strut such that the second flange extends inwardly from the strut in the second direction, and is offset from the first flange in a third direction that is transverse to the first and second directions. Moreover, the fan belt guarding housing includes an access panel that includes a cutout formed in an outer edge of the access panel such that the cutout forms a recess between extensions of the outer edge. The recess is sized to pass around the second flange along the third direction to allow the extensions of the outer edge to engage the first flange and then slide along the first direction into an installed position between the first flange and the second flange.

BRIEF DESCRIPTION OF THE DRAWINGS

Various aspects of the present disclosure may be better understood upon reading the following detailed description and upon reference to the drawings, in which:

FIG. 5 is a perspective view of an embodiment of a fan assembly having a fan belt guard with an access panel, which may be used in any of the HVAC system of FIGS. 1-4, in accordance with aspects of the present disclosure;

DETAILED DESCRIPTION

Figure 1:
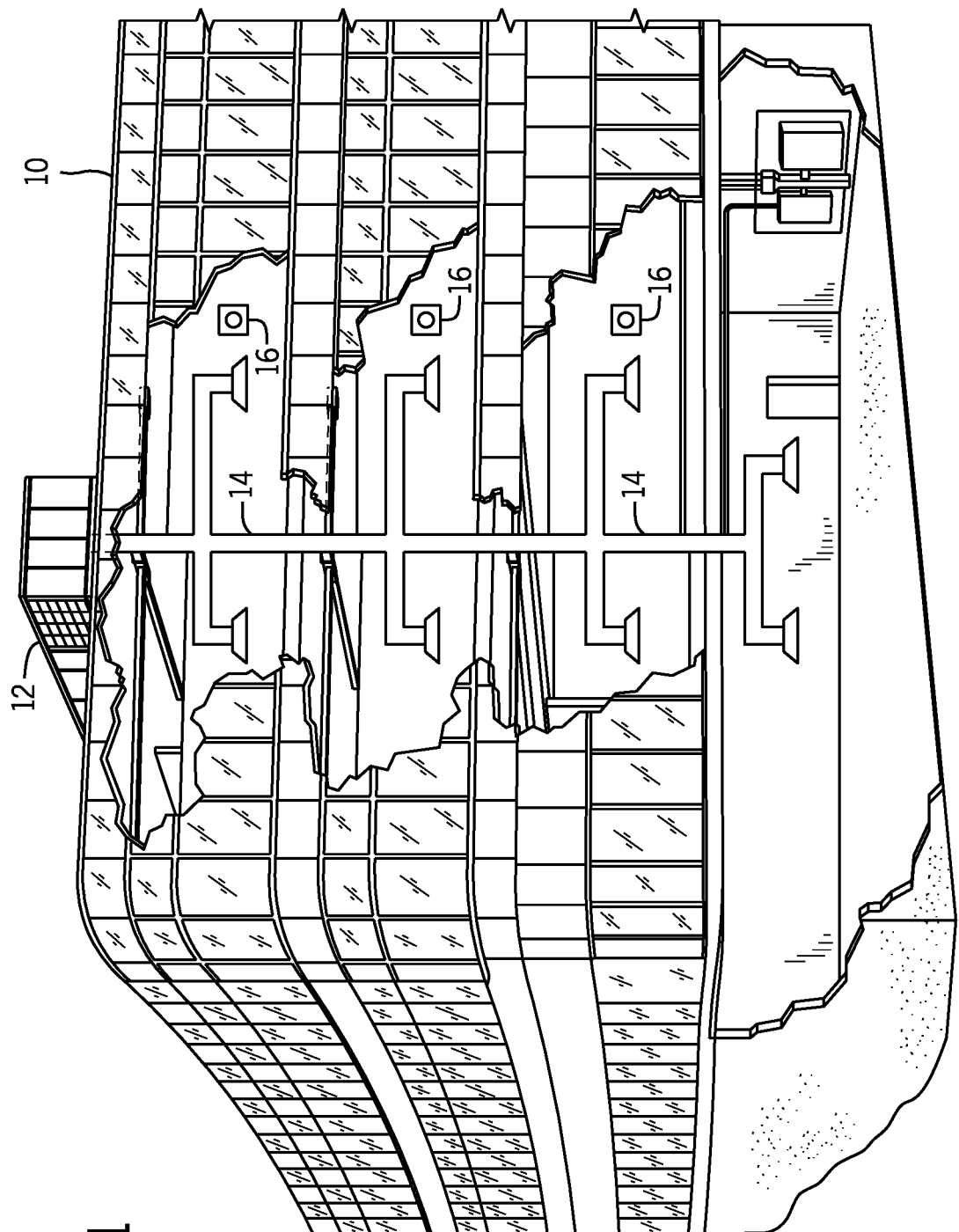
FIG. 1 is a perspective view of an embodiment of a building having a heating, ventilation, and air conditioning (HVAC) system for building environmental management that may employ one or more HVAC units, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems often include components that operate via rotational motion, such as fans, blowers, compressor, and so forth. Such components may be driven by a motor, and rotational motion of the motor may be transferred to the driven component by a belt or other band. As will be appreciated, belts or other elements that transfer rotational motion from one component to another may be susceptible to wear, degradation, misalignment, inefficient performance, and so forth. Thus, it is desirable to access such components periodically to perform routine maintenance, adjustments, repair, and/or other operations or procedures to enable proper operation of the belt and related components. However, it is also desirable to enclose the belt and/or other moving components during operation to block interference with the belt.

Therefore, to enable efficient access to the belt during non-operational periods of the HVAC system while also enabling selective enclosure of the belt during operational periods, present embodiments are directed to a belt guard housing (e.g., fan belt guard housing) having an access panel that may be readily removed from and coupled to the belt guard housing. As discussed below, the access panel may be removed and re-installed with the fan belt guard housing without additional elements, such as mechanical fasteners, that are typically utilized to secure a panel to a housing. In this way, the disclosed embodiments enable more efficient access to a belt that is enclosed and protected by a belt guard housing during operation, which may simplify installation procedures, reduce downtime of the HVAC system for maintenance, and reduce costs associated with the belt guard housing.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, then HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. The control device 16 may dynamically adjust the default airflow rate of conditioned air delivered to each zone in the HVAC system as described herein. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
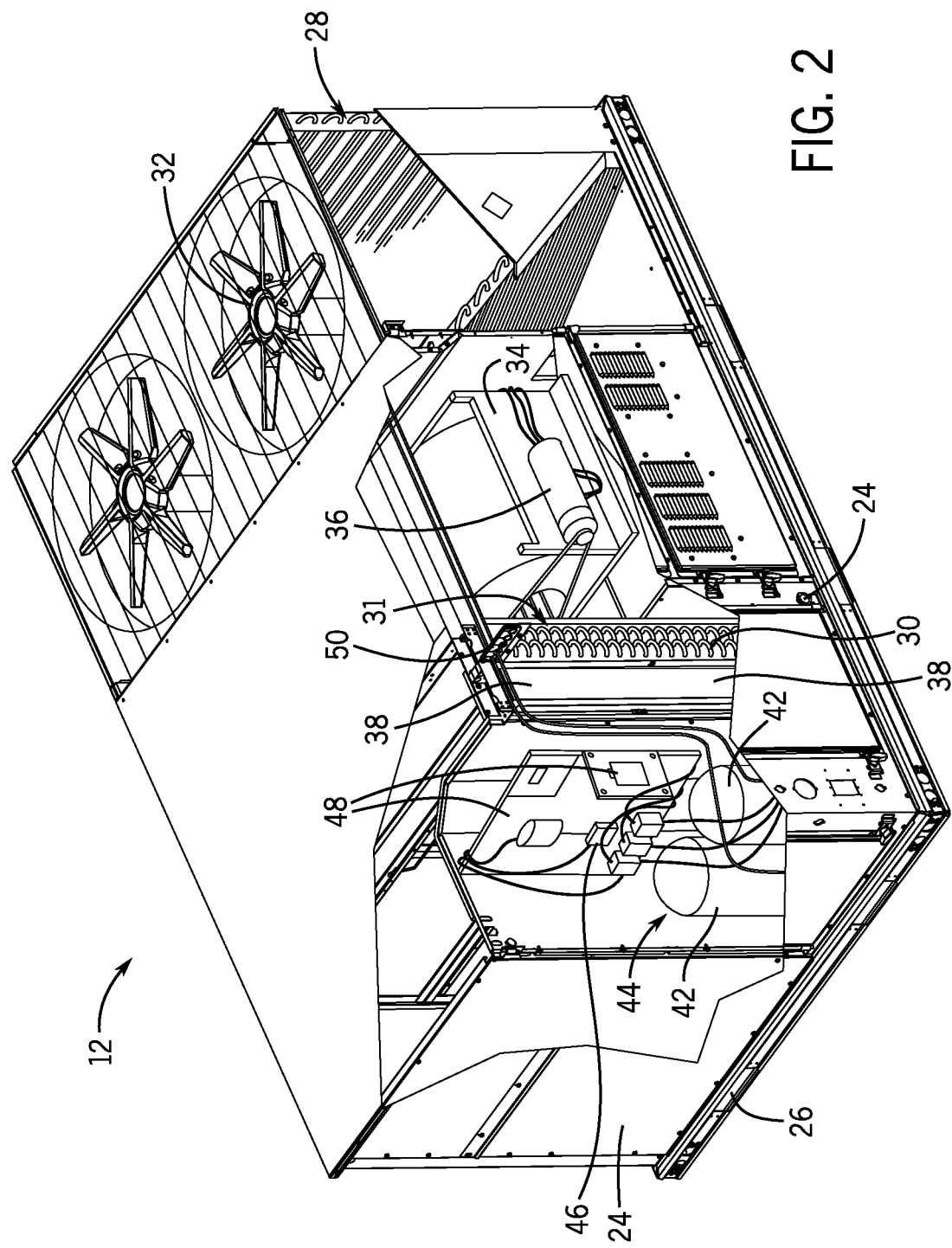
FIG. 2 is a perspective view of an embodiment of HVAC unit of the HVAC system of FIG. 1, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 may also include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 49 may connect the control board 48 and the terminal block 46 to the equipment of the HVAC unit 12.

Figure 3:
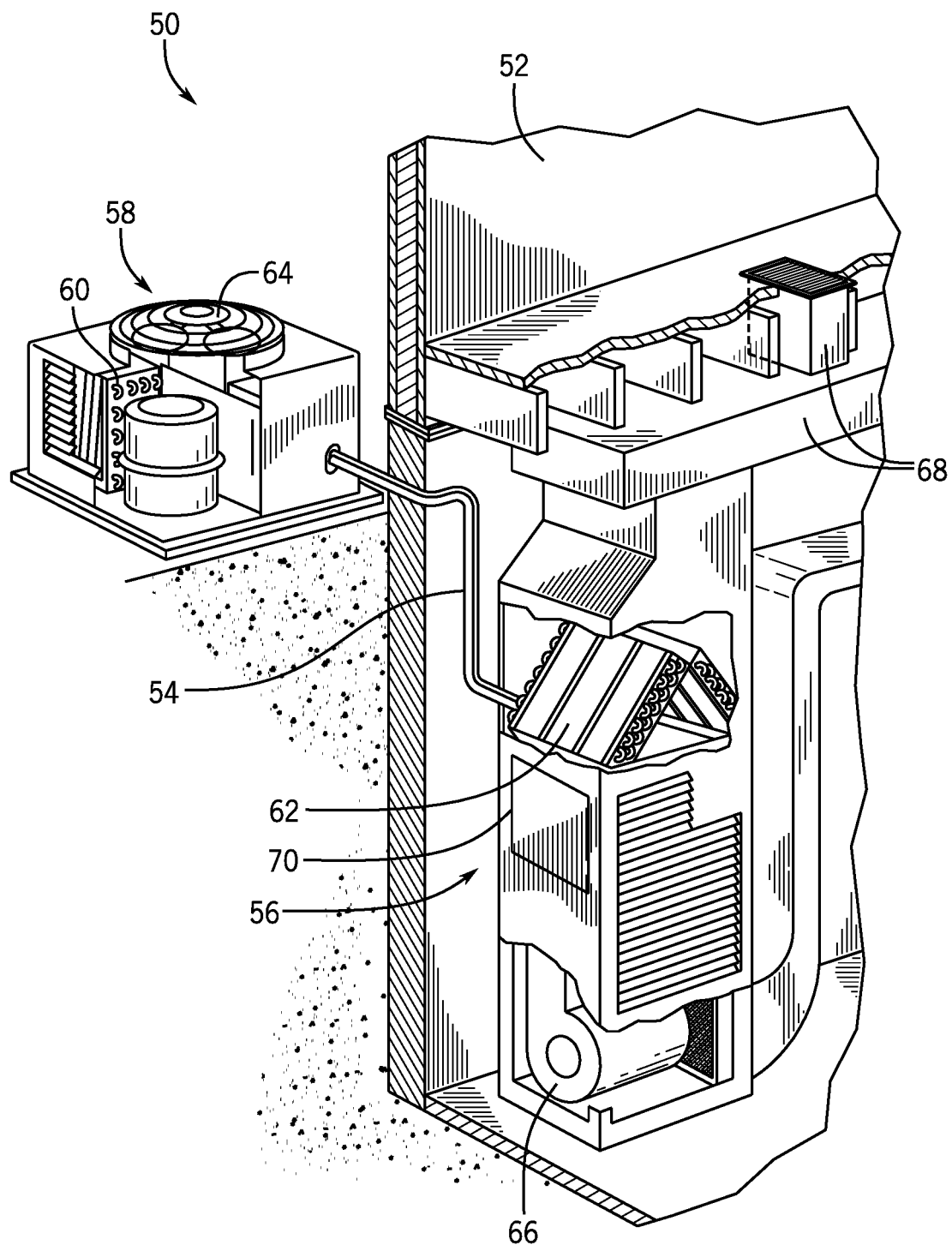
FIG. 3 is a perspective view of an embodiment of a split, residential HVAC system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
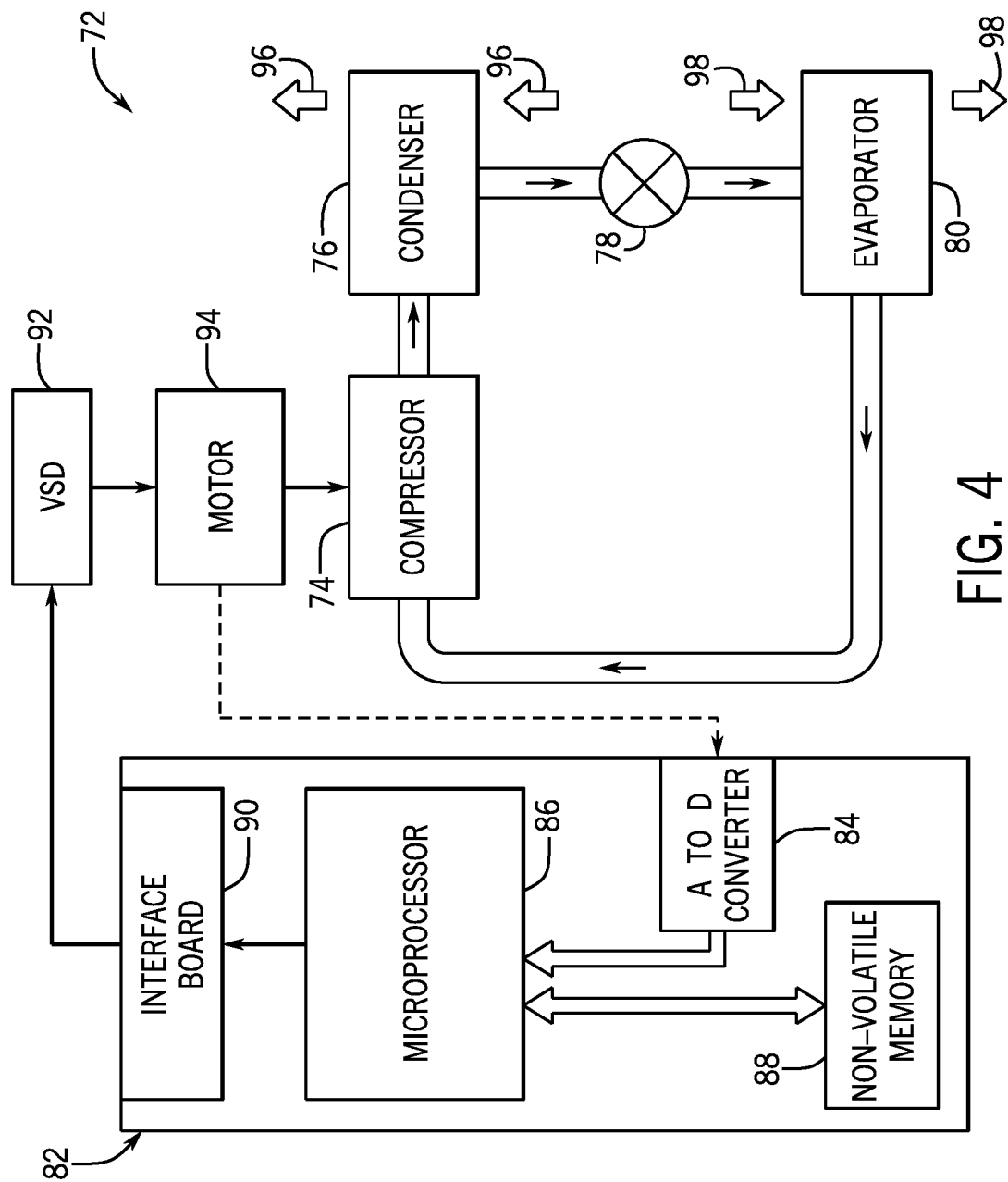
FIG. 4 is a schematic of an embodiment of a vapor compression system that may be used in the HVAC system of FIG. 1 or in the split, residential HVAC system of FIG. 3, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 may receive alternating current (AC) power having a particular fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As mentioned above, present embodiments are directed to a housing, such as a fan belt guard housing, having an access panel that is readily installed, removed, and re-installed with the housing. Indeed, the disclosed embodiments include an access panel that is retained and secured in an installed position to enclose components within the housing without utilizing additional components that are typically used to secure a panel to a housing, such as mechanical fasteners (e.g., nuts, bolts, screws, washers, clamps, latches, etc.). The access panel is also readily removed from the installed position (e.g., without removal of mechanical fasteners and/or use of tools) to enable efficient access to the belt and other components disposed within the housing. Thus, the present embodiments enable more efficient access to the belt within the housing, which reduces the time utilized to perform adjustment, maintenance, repair, and other procedures associated with the belt and related components.

FIG. 5 is a perspective view of a fan assembly 500 (e.g., exhaust fan assembly) having a fan belt guard housing 502, in accordance with the present techniques. The fan belt guard housing 502 includes an access panel 510 that is configured to removably couple to the fan belt guard housing 502 to enable efficient access to components disposed within the fan belt guard housing 502. For example, as shown in the illustrated embodiment, the fan assembly 500 includes a fan 505 that is configured to be driven by a motor 501, where the motor 501 and the fan 505 are coupled to one another via a fan belt 504. The motor 501 and the fan 505 each include a respective pulley, wheel, or sheave that engages with the fan belt 504 to enable transfer of rotational motion of the motor 501 to the fan 505. When the access panel 510 is in an installed configuration with the fan belt guard housing 502, the belt and pulleys are enclosed within the fan belt guard housing 502 to block interference with the belt and pulleys by external elements. Throughout the following discussion, reference may be made to a lateral axis 122 of the fan assembly 500, a longitudinal axis 120 of the fan assembly 500, and a vertical axis 124 of the fan assembly 500. Furthermore, although the fan assembly 500 shown in the embodiment includes an exhaust fan, other embodiments of the fan assembly 500 may include other types of fans or blowers (e.g., return fan, supply fan, etc.) that are belt-driven. Moreover, an HVAC system may additionally or alternatively include other components, such as compressors, that are driven by a motor and a belt or band. Accordingly, the systems and techniques disclosed herein may be utilized in a variety of applications to enable protection and efficient accessibility of belt, band, and/or other similar components.

As illustrated, the fan belt guard housing 502 may include a frame 516 (e.g., main body 519 or base housing) that is coupled to (e.g., installed) a support structure 503 (e.g., an exhaust fan frame) of the fan assembly 500 configured to support a fan 505 of the fan assembly 500. The frame 516 is disposed in a vertical orientation, but in other embodiments, the frame 516 may be disposed in a horizontal orientation or any other suitable orientation. The frame 516 generally defines an internal volume (e.g., inward space) in which the fan belt 504 and the pulleys are disposed. As the pulleys are coupled to the one of the motor 501 or the fan 505, the frame 516 includes cutouts or apertures through which a shaft or other coupling element may extend from the motor 501 or fan 505 to one of the pulleys. It should be appreciated that some embodiments may include other components other than the fan belt 504 that are disposed within the frame 516 and the efficient access of which (e.g., via the access panel 520) is desirable for maintenance, repair, adjustment, or other suitable purposes.

The access panel 510 is configured to removably couple to the frame 516. The frame 516 may be generally shaped such that the frame 516 defines a perimeter of the fan belt guard housing 502 to define a first geometric profile. The access panel 520 may be formed to define a second geometric profile that correlates, corresponds to, and/or generally matches the first geometric profile of the frame 516. In some embodiments, the first geometric profile and the second geometric profile may be a triangle, rectangle, pentagon, hexagon, or any other suitable geometric shape. As the first and second geometric profiles generally correspond with one another, the frame 516 and the access panel 510 may generally enclose the fan belt 504 when the access panel 510 is installed configuration, thereby blocking access to or interference with the fan belt 504.

The frame 516 includes several panels that cooperatively form the frame 516 to define the internal volume in which the fan belt 504 is disposed. For example, the frame 516 in the illustrated embodiment includes a rear panel 532 and a plurality of lateral struts that extends from the rear panel 532 (e.g., along the lateral axis 122) to define the first geometric profile of the frame 516 and to define the internal volume in which the fan belt 504 is disposed. For example, a first lateral strut 518 extends from the rear panel 532 along the lateral axis 122 and also extends along the vertical axis 124. The first lateral strut 518 includes a first flange 520 that extends from a main body 519 of the first lateral strut 518 by a first distance along the longitudinal axis 120 and a second flange 522 that extends from the main body 519 of the first lateral strut 518 by a second distance along the longitudinal axis 120, where the first distance is greater than the second distance. Moreover, the first flange 520 and the second flange 522 extends inwardly from the first lateral strut 518 (e.g., along the longitudinal axis 120). Additionally, the first and second flanges 520 and 522 may be spaced from the rear panel 532 (e.g., along the lateral axis 122) by different distances, such that the first and second flanges 520 and 522 are offset from one another along the lateral axis 122 to define a gap 810 (e.g., in the direction of the lateral axis 122) between the first flange 520 and the second flange 522. As discussed below, the access panel 510 may be at least partially positioned within the gap 810, such that the access panel 510 is at least partially captured between the first flange 520 and the second flange 522 to couple the access panel 510 to the frame 516. In some embodiments, the first lateral strut 518 may include a plurality of the first flanges 520 and/or a plurality of the second flanges 522 to define a plurality of gaps (e.g., extending along the lateral axis 122) formed therebetween. Additionally or alternatively, the frame 516 may include another lateral strut, similar to the first lateral strut (e.g., extending along the vertical axis 124, extending from the rear panel 532 along the lateral axis 122 and having the first and second flanges 520 and 522 described above). For example, in the illustrated embodiment, the frame 516 includes an additional lateral strut 524 similar to the first lateral strut 518 positioned on a side of the frame 516 opposite the first lateral strut 518. The flanges of the additional lateral strut 524 may also define gaps configured to capture the access panel 510 in the installed configuration.

Figure 7:
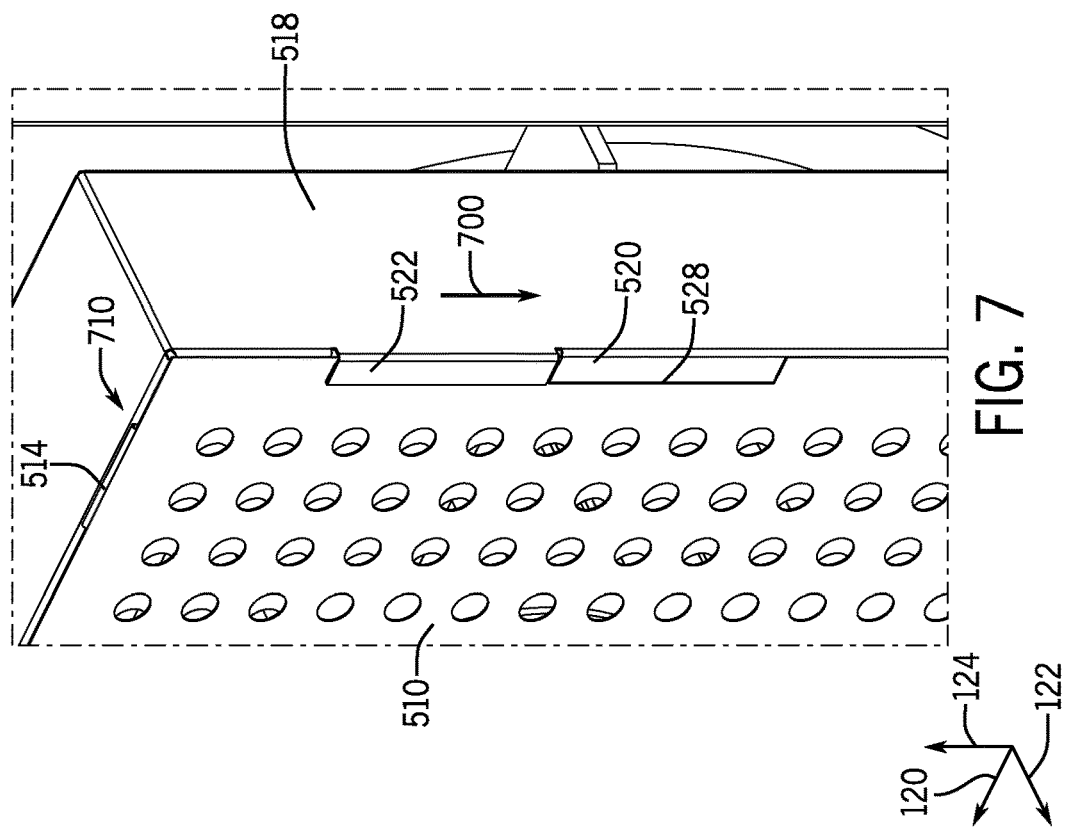
FIG. 7 is an expanded perspective view of an embodiment of the fan belt guard and access panel of FIG. 5, illustrating installation of the access panel with a housing of the fan belt guard, in accordance with aspects of the present disclosure.

The frame 516 of the fan belt guard housing 502 may further include a second lateral strut 530 that extends from the rear panel 532 along the lateral axis 122 and also extends in the longitudinal direction 120 (e.g., crosswise) from the first lateral strut 518. The second lateral strut 530 may include slots configured to receive a hook flange 514 of the access panel 510, as illustrated in FIG. 7 and further described below.

As mentioned above, the frame 516 includes the rear panel 532, which may be coupled to a first side 536 of the fan belt guard housing 502, such as coupled to the first lateral strut 518 and the second lateral strut 530 on the first side 536 of the fan belt guard housing 502. To couple the access panel 510 to the frame 516 and enclose the fan belt 504 within the internal volume of the frame 516, the access panel 510 may couple to a second side 538 of the fan belt guard housing 502. Thus, when the access panel 510 is coupled to the frame 516, the first lateral strut 518 and the second lateral strut 530 each extend along the lateral axis 122 between the rear panel 532 on the first side 536 of the fan belt guard housing 502 and the access panel 510 on the second side 538 of the fan belt guard housing 502.

In some embodiments, the access panel 510 may include a plurality of holes 512 that may be cut out or otherwise formed therein. The plurality of holes 512 may be of any suitable shape or design and may be arrayed or distributed across the access panel 510 evenly, randomly, or in any suitable configuration. In certain embodiments, the plurality of holes 512 may enable an operator to install and/or remove the access panel 510 from the frame 516. Additionally or alternatively, in some embodiments the body 513 of the access panel 510 may include a larger cut out or aperture that may be used as a viewing window to observe the fan belt 504 and/or to enable an operator to grip and manipulate the access panel 510 (e.g., to couple and decouple the access panel 510 from the frame 516).

Moreover, the access panel 510 may include one or more cutouts 528 that are formed in an outer edge 511 of the access panel 510, such that the cutout 528 may form a recess in the access panel 510. As shown in further detail with reference to FIGS. 6 and 7, the cutout 528 enables coupling of the access panel 510 to the frame 516 via the first and second lateral struts 518 and 530. For example, to couple the access panel 510 to the frame 516, the cutout 528 may be sized to pass around the second flange 522 (e.g., along the lateral axis 122) so that the cutout 528 may align with the second flange 522 of the frame 516 (e.g., along longitudinal axis 120). After the cutout 528 may be aligned with the second flange 522, the extensions 509 of the outer edge 511 may engage with the first flange 520 of the access panel 510 and then may be translated along the vertical axis 124 to position the access panel 510 at least partially within the gap 810 between the first flange 520 and the second flange 522, thereby capturing the access panel 510 and retaining the access panel 510 against the frame 516 (e.g., an installed position). In some embodiments, the access panel 510 may include a plurality of cutouts 528 formed along and in the outer edge 511 of the access panel 510, and each cutout 528 may correspond to a respective second flange 520 formed in one of the lateral struts (e.g., lateral strut 518) of the frame 516. In this way, the access panel 510 may be positioned within multiple gaps formed by multiple first and second flanges 520 and 522, thereby improving securement of the access panel 510 to the frame 516.

Figure 6:
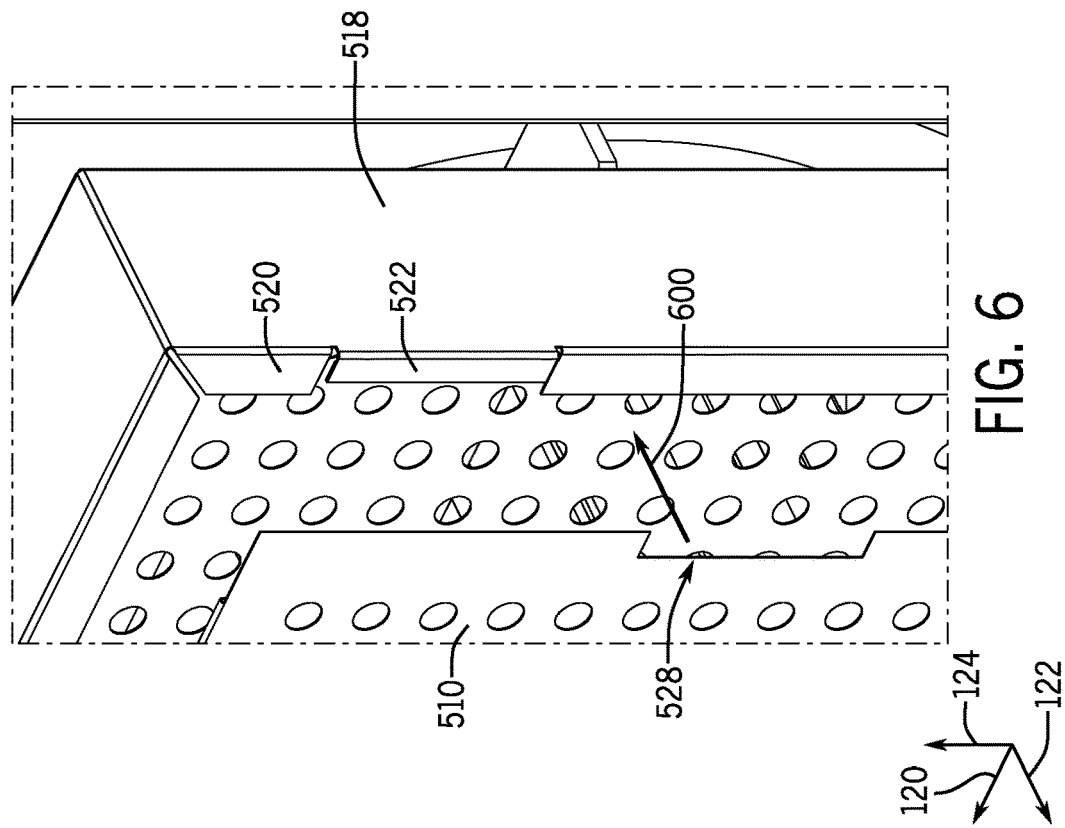
FIG. 6 is an expanded perspective view of an embodiment of the fan belt guard and access panel of FIG. 5, illustrating installation of the access panel with a housing of the fan belt guard, in accordance with aspects of the present disclosure.

FIG. 6 is an expanded perspective view of an embodiment of the access panel 510, illustrating installation or coupling of the access panel 510 to the frame 516. As shown, the access panel 510 may be transitioned along the lateral axis 122, as indicated by arrow 600, toward the frame 516. The access panel 510 is positioned relative to the frame 516 such that the cutout 528 is aligned with the second flange 522 (e.g., along the lateral axis 122 as the access panel 510 is transitioned in direction 600). In other words, the cutout 528 and the second flange 522 overlap with one another along the vertical axis 124). With the cutout 528 and the second flange 522 in alignment, the access panel 510 (e.g., a peripheral surface 515 of the access panel 510) may be biased the first flange 520.

As previously mentioned and described further below with reference to FIG. 8, the first flange 520 may be positioned a first distance away from the rear panel 532 along the lateral axis 122 and the second flange 522 may be positioned a second distance away from the rear panel 532 along the lateral axis 122, where the second distance is greater than the first distance to create a gap 810 (e.g., along the lateral axis 122) therebetween. As a result, when the access panel 510 is biased against the first flange 520, the second flange 522 may be spaced a greater distance from the rear panel 532 than the access panel 510 to enable transition of the access panel 510 into the gap 810 formed between the first flange 520 and the second flange 522. In embodiments of the fan belt guard housing 502 having pluralities of cutouts 528 and second flanges 520, each cutout 528 of the access panel 510 may be configured to align with a corresponding second flange 520 of the frame 516.

FIG. 7 is an expanded perspective view of an embodiment of the access panel 510, illustrating transition of the access panel 510 along the vertical axis 124 after the access panel 510 is biased against the first flange 520, with the cutout 528 and the second flange 522 in alignment with one another. As illustrated, the access panel 510 is translated downward along the vertical axis 124, as indicated by arrow 700, such that the cutout 528 is no longer aligned with the second flange 522. Upon translation along the vertical axis 124, the access panel 510 transitions into an installed position, whereby a peripheral surface 515 of the access panel 510 is captured within the gap 810 between the first flange 520 and the second flange 522 (e.g., relative to the lateral axis 122). The translation along the vertical axis 124 in the direction of arrow 700 may further enable the hook flange 514 of the access panel 510 to extend into a slot 710 of frame 516 to further couple and secure the access panel 510 to the frame 516. In some embodiments, the access panel 510 may include a plurality of hook flanges 514 that are each configured to extend into a respective slot 710 formed in the frame 516 when the access panel 510 is coupled to the frame 516. As the fan belt guard assembly 502 is disposed in a generally vertically orientation, the access panel 510 may be retained in the installed configuration (e.g., within the gap 810 between the first and second flanges 520 and 522) via gravity until an operator manipulates the access panel 510 to decouple the access panel 510 from the frame 516 be performing the steps described above in reverse order.

Figure 8:
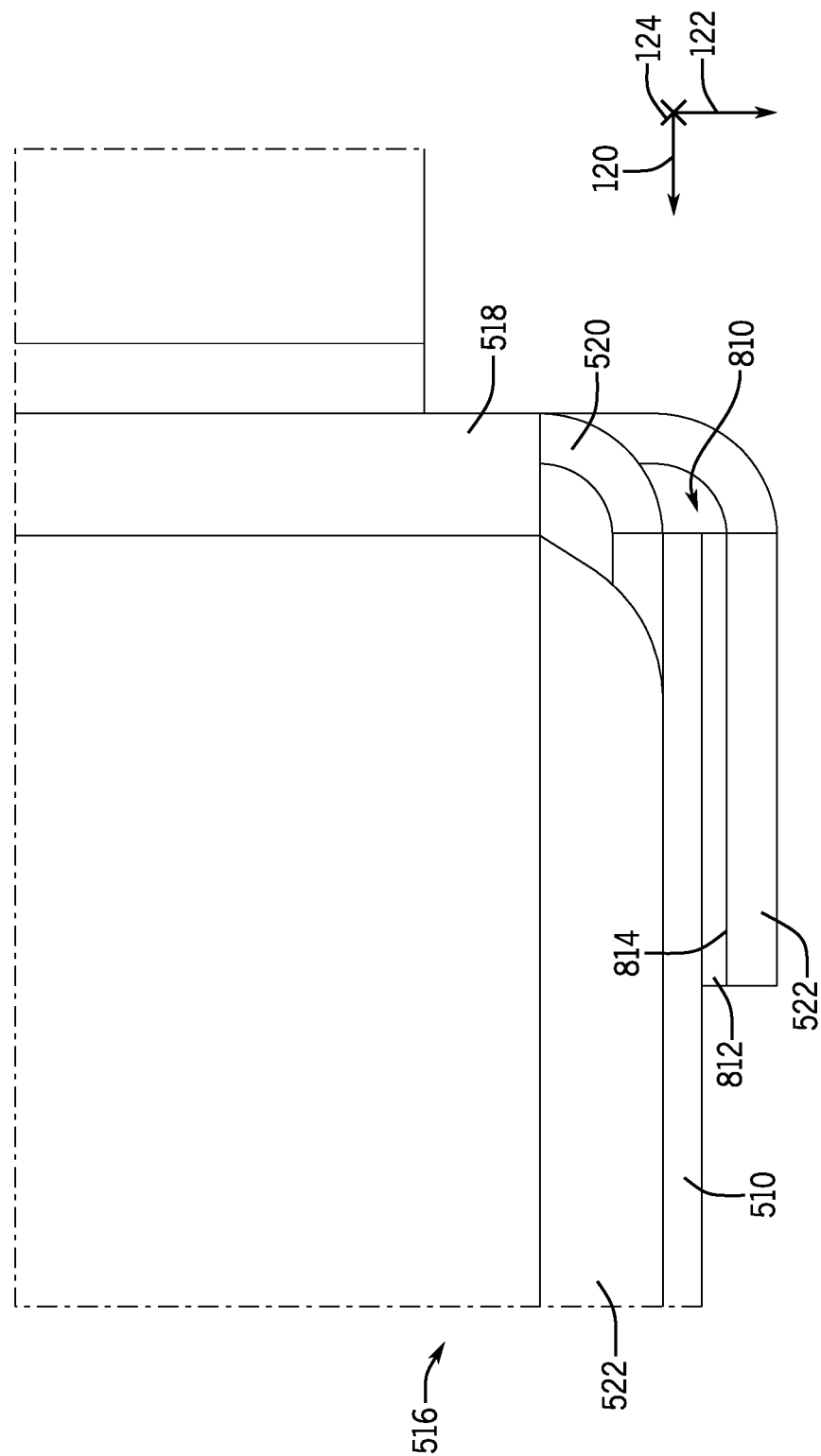
FIG. 8 is an expanded top view of an embodiment of the access panel coupled to a housing of the fan belt guard, in accordance with aspects of the present disclosure.

FIG. 8 is an expanded top view of an embodiment of the access panel 510 in an installed position. As previously described, the first flange 520 and the second flange 522 are offset from one another along the lateral axis 122 to form the gap 810 therebetween, such that the access panel 510 may translate into the gap 810 during installation of the access panel 510. In some embodiments, the second flange 522 may include a gasket 812 that is positioned on the inner surface 814 of the second flange 522 within the gap 810 and is configured to contact the access panel 510 in the installed configuration. Specifically, when the access panel 510 is installed, the gasket biases the access panel 510 against the first flange 520. Additionally or alternatively, a second gasket may be disposed on the first flange 520 to bias the access panel 510 against the second flange 522 and/or against the gasket 812. In some embodiments, the gasket 812 may be made of an at least partially compressible material, such as a material having a 70 percent compression rate (e.g., polyethylene), and/or the gasket 812 may be secured to the second flange 522 via an adhesive or other material or process. The gasket 812 may enable secure retention of the access panel 510 within the gap 810 and may also damp or reduce vibrations or noise that may be generated during operation of the HVAC equipment.

Figure 9:
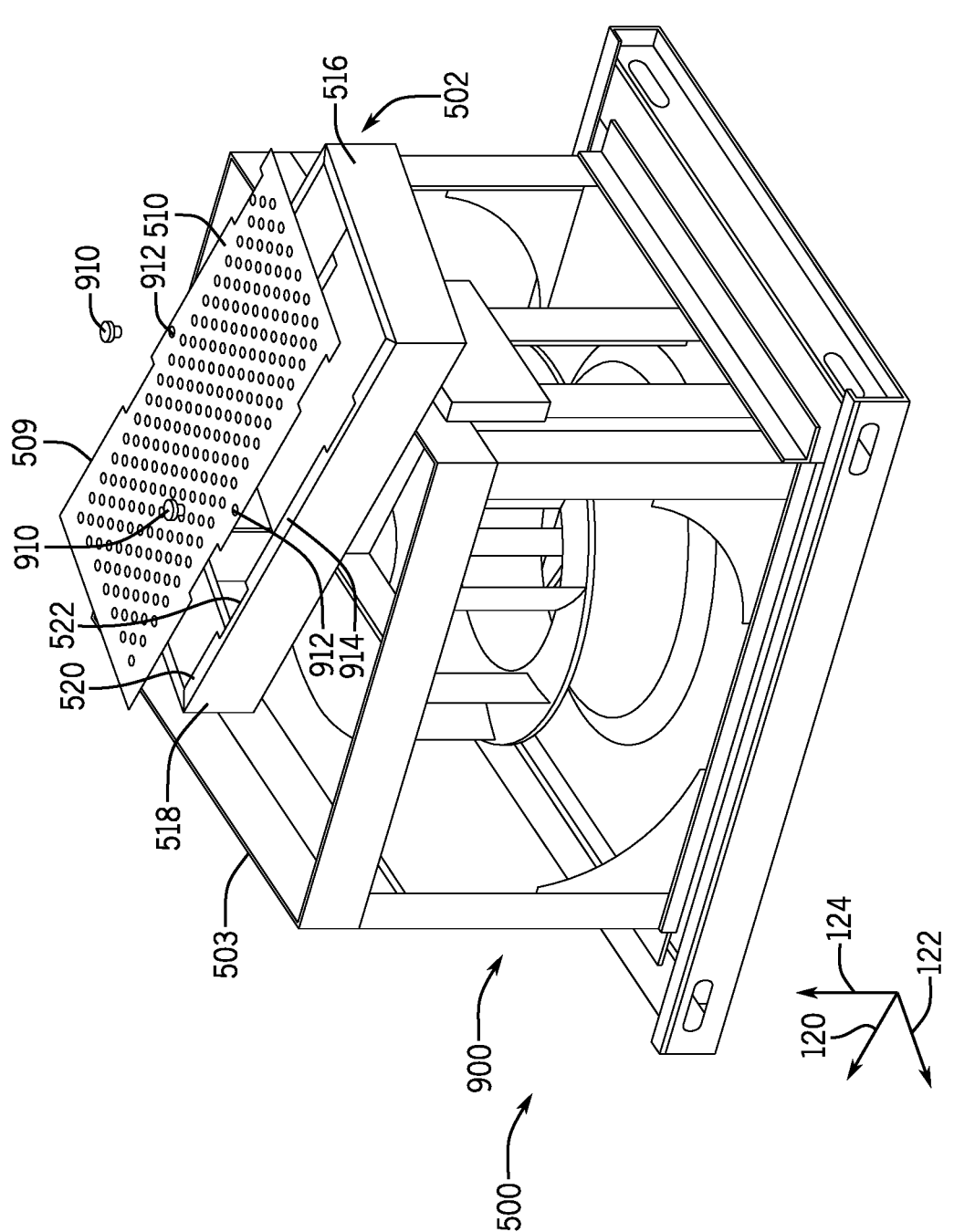
FIG. 9 is an embodiment of a fan assembly having a fan belt guard with an access panel, which may be used in any of the HVAC system of FIGS. 1-4, in accordance with aspects of the present disclosure.

FIG. 9 is a perspective view of an embodiment of the fan assembly 500 having the fan belt guard housing 502 with the access panel 510 configured to be removably coupled thereto. In the illustrated embodiment, the fan assembly 500 includes a return fan 900. The embodiment of the fan belt guard housing 502 illustrated includes similar elements and element numbers as those described above with reference to FIGS. 5-8. Further, the fan belt guard housing 502 is shown in a horizontal orientation with the fan assembly 500 such that the fan belt guard housing 502 may be coupled to a support structure 503 (e.g., a return fan frame) of the fan assembly 500. As discussed above, the frame 516 may be generally shaped such that the frame 516 defines a perimeter of the fan belt guard housing 502 having a first geometric profile (e.g., generally rectangular) that corresponds to a second geometric profile (e.g., generally rectangular) of the access panel 510. In some embodiments, the second geometric profile may be defined by the outer edge 511 of the access panel 510 such that the first geometric profile may be correlated.

In some embodiments, the fan belt guard housing 502 may include one or more fasteners 910 (e.g., hand screws) to further secure the access panel 510 to the frame 516 in the installed configuration. Indeed, the access panel 510 may not be securely retained within the gap 810 via gravity when the fan belt guard housing 502 is in the horizontal orientation shown. The fastener 910 may extend through a first aperture 912 formed in the access panel 510 and into a second aperture 914 formed in the first flange 520 or in any other suitable portion of the frame 516. In some embodiments, the fastener 910 may be used when operation of the HVAC equipment (e.g., the return fan 900) may induce vibrations in the access panel 510 to reduce unintended movement of the access panel 510 relative to the frame 516.

Figure 10:
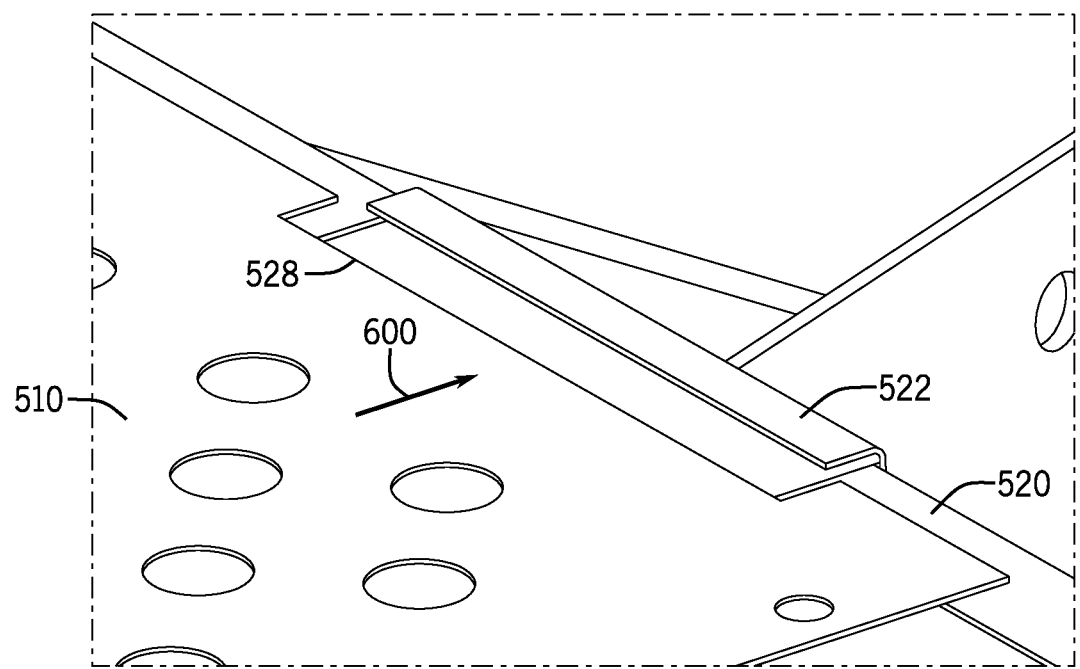
FIG. 10 is an expanded perspective view of an embodiment of the fan belt guard and access panel of FIG. 9, illustrating installation of the access panel with a housing of the fan belt guard, in accordance with aspects of the present disclosure.

FIG. 10 is an expanded perspective view of an embodiment of the access panel 510, illustrating transition of the access panel 510 into an installed configuration. Specifically, as similarly described above, the cutout 528 is aligned with the second flange 522, and the access panel 510 is moved in the direction of arrow 600 to abut and/or bias against the first flange 520 with the cutout 528 and the second flange 522 overlapping with one another (e.g., along the vertical axis 124).

Figure 11:
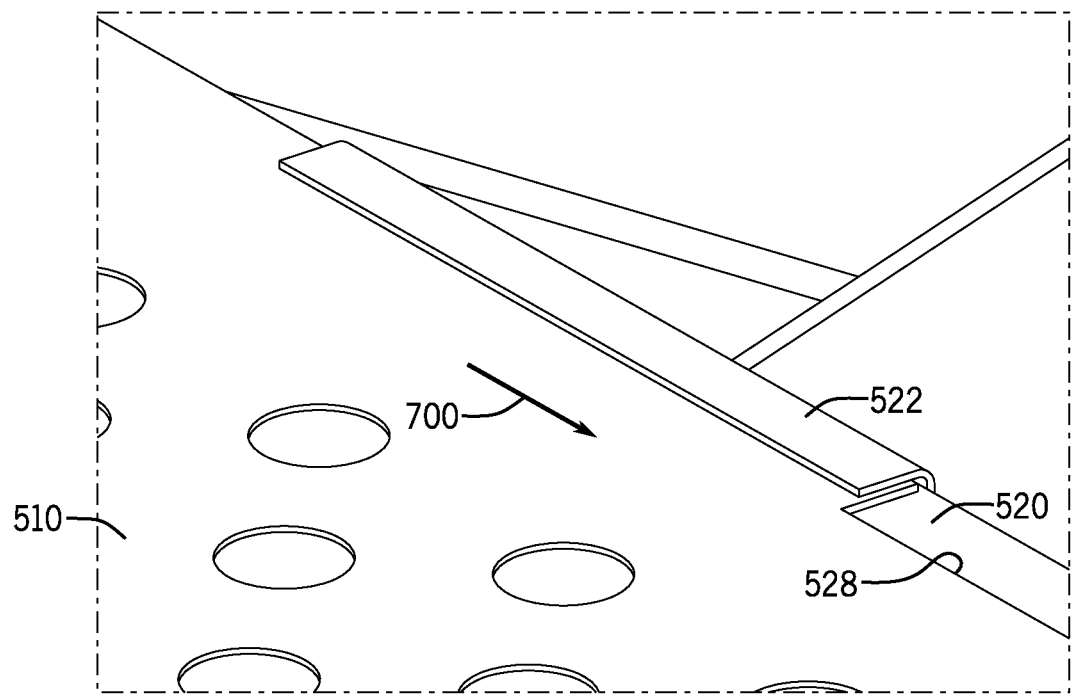
FIG. 11 is an expanded perspective view of an embodiment of the fan belt guard and access panel of FIG. 9, illustrating installation of the access panel with a housing of the fan belt guard, in accordance with aspects of the present disclosure.

FIG. 11 is an expanded perspective view of the embodiment of the access panel 510 and frame 516 shown in FIG. 10, illustrating transition of the access panel 510 into the gap 810 between the first flange 520 and the second flange 522. Similar to the previously described embodiment, the access panel 510 may be biased the first flange 520 (e.g., via gravity) and may be translated in the direction of arrow 700, such that the cutout 528 is no longer aligned with the second flange 522. In this way, a peripheral surface 515 of the access panel 510 is positioned within the gap 810 to retain the access panel 510 against the frame 516 (e.g., along the vertical axis 124). Additionally, a gasket may be disposed within the gap 810 to bias the access panel 510 against the first flange 520, the second flange 522, or a second gasket to secure the access panel 510 to the frame 516 and/or to damp vibrations induced during operation of the fan assembly 500. After the access panel 510 is in the installed configuration, the fastener 910 may be installed to further secure the access panel 510 to the frame 516.

As set forth above, embodiments of the present disclosure may provide one or more technical effects useful during the maintenance and repair for an HVAC system. Specifically, embodiments are directed to a fan belt guard housing configured to enable efficient access to a belt or other component enclosed therein during non-operational periods of the HVAC system while also enabling selective enclosure of the belt during operational periods. To this end, the fan belt guard housing includes an access panel that may be readily removed from and coupled to a frame of the fan belt guard housing. The access panel may be removed and re-installed with the fan belt guard housing without additional elements that are typically utilized to secure a panel to a housing. In this way, the disclosed embodiments enable more efficient access to a belt or other components that is enclosed and protected by the fan belt guard housing during operation, which may simplify installation procedures, reduce downtime of the HVAC system for maintenance, repair, and/or adjustment, and reduce costs associated with the fan belt guard housing. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A fan belt guard housing configured to contain a fan belt of a heating, ventilation, and/or air conditioning (HVAC) unit, comprising:
   a frame including a first lateral strut, a first flange extending from the first lateral strut and a second flange extending from the first lateral strut, wherein the first flange is offset from the second flange to define a gap therebetween; and
   an access panel configured to removably couple to the frame, wherein the access panel includes a cutout formed in an outer edge of the access panel, wherein the cutout is configured to align with the second flange of the frame such that the access panel can then slide along the first flange to position the outer edge of the access panel within the gap and capture the access panel between the first flange and the second flange in an installed configuration of the access panel.

2. The fan belt guard housing of claim 1, comprising a gasket coupled to an inner surface of the second flange, wherein the gasket is configured to bias the access panel against the first flange in the installed configuration of the access panel.

3. The fan belt guard housing of claim 1, wherein the frame includes a second lateral strut extending crosswise from the first lateral strut, the second lateral strut includes a slot formed therein, and the access panel includes a hook flange extending from the outer edge of the access panel, wherein the hook flange is configured to extend into the slot in the installed configuration of the access panel.

4. The fan belt guard housing of claim 1, wherein the access panel includes a first aperture disposed adjacent to the outer edge, the first flange includes a second aperture, and the fan belt guard housing includes a hand screw configured to extend into the first aperture and the second aperture to secure the access panel to the frame in the installed configuration of the access panel.

5. The fan belt guard housing of claim 4, wherein the fan belt guard housing is configured to couple to a return fan frame of the HVAC unit, and the access panel is disposed in a horizontal orientation in the installed configuration of the access panel.

6. The fan belt guard housing of claim 1, wherein the frame is configured to couple to an exhaust fan frame of the HVAC unit, and the access panel is disposed in a vertical orientation in the installed configuration of the access panel.

7. The fan belt guard housing of claim 1, wherein the frame extends about a perimeter of the fan belt guard housing to define a first geometric profile of the fan belt guard housing, the outer edge of the access panel defines a second geometric profile of the access panel, and the first geometric profile and the second geometric profile are correlated.

8. The fan belt guard housing of claim 7, comprising a rear panel coupled to a first side of the fan belt guard housing, wherein the access panel is configured to removably couple to a second side of the fan belt guard housing opposite the first side, and the first lateral strut extends between the first side and the second side.

9. A fan belt guard housing configured to contain a fan belt of a heating, ventilation, and/or air conditioning (HVAC) unit, comprising:
  a frame formed of a plurality of struts and defining an inward space configured to house the fan belt, wherein a strut of the plurality of struts has a length extending along a first direction;
  a first flange positioned along a first portion of the strut, wherein the first flange extends inwardly from the strut along a second direction that is transverse to the first direction;
  a second flange positioned along a second portion of the strut, wherein the second flange extends inwardly from the strut in the second direction and is offset from the first flange in a third direction that is transverse to the first and second directions; and
  an access panel including a cutout formed in an outer edge of the access panel such that the cutout forms a recess between extensions of the outer edge, wherein the recess is sized to pass around the second flange along the third direction to allow the extensions of the outer edge to engage the first flange and then slide along the first direction into an installed position between the first flange and the second flange.

10. The fan belt guard housing of claim 9, comprising a gasket coupled to an inner surface of the second flange, wherein the gasket is configured to bias the access panel against the first flange in the installed position of the access panel.

11. The fan belt guard housing of claim 10, wherein the gasket comprises a compressible material.

12. The fan belt guard housing of claim 9, wherein the strut is a first strut and the plurality of struts comprises a second strut extending crosswise from the first strut, the second strut includes a slot formed therein, and the access panel includes a hook flange extending from the outer edge of the access panel, wherein the hook flange is configured to extend into the slot in the installed position of the access panel.

13. The fan belt guard housing of claim 9, wherein the strut is a first strut and the plurality of struts comprises a second strut disposed on a side of the frame opposite the first strut and extending in the first direction, the second strut comprises a third flange positioned along a third portion of the second strut, the third flange extends inwardly from the second strut along the second direction, the second strut comprises a fourth flange positioned along a fourth portion of the second strut, the fourth flange extends inwardly from the second strut in the second direction and is offset from the third flange in the third direction.

14. The fan belt guard housing of claim 13, wherein the cutout is a first cutout, the access panel comprises a second cutout formed in the outer edge of the access panel on a side of the access panel opposite the first cutout.

15. The fan belt guard housing of claim 9, wherein the access panel includes a plurality of openings arrayed across the access panel.

16. The fan belt guard housing of claim 9, wherein at least one strut of the plurality of struts is configured to couple to a fan frame of the HVAC unit that is configured to support a fan of the HVAC unit.

17. A fan belt guard housing configured to contain a fan belt of a heating, ventilation, and/or air conditioning (HVAC) unit, comprising:
  a frame comprising a strut extending in a first direction, a first flange extending from the strut in a second direction transverse to the first direction, and a second flange extending from the strut in the second direction, wherein the first flange extends from the strut by a first dimension, the second flange extends from the strut by a second dimension, and the first dimension is greater than the second dimension, and the first flange is offset from the second flange in a third direction transverse to the first direction and the second direction to create a gap between the first flange and the second flange in the third direction; and
  an access panel comprising a cutout formed in an outer edge of the access panel, wherein the cutout is configured to overlap with the second flange and transition along the first flange to position the outer edge at least partially within the gap and secure the access panel to the frame.

18. The fan belt guard housing of claim 17, comprising a gasket disposed within the gap and configured to bias the access panel against the first flange or the second flange when the outer edge is at least partially within the gap.

19. The fan belt guard housing of claim 17, wherein the access panel comprises a plurality of apertures formed therein, wherein the plurality of apertures is configured to enable viewing of the fan belt when the access panel is secured to the frame.

20. The fan belt guard housing of claim 17, wherein the frame includes a rear panel coupled to the strut of the frame, to an additional strut of the frame, or both, and wherein the rear panel is disposed on a side of the frame opposite the access panel when the access panel is secured to the frame.

* * * * *